US010685010B2

(12) United States Patent
Friedman et al.

(10) Patent No.: US 10,685,010 B2
(45) Date of Patent: Jun. 16, 2020

(54) SHARED VOLUMES IN DISTRIBUTED RAID OVER SHARED MULTI-QUEUE STORAGE DEVICES

(71) Applicant: Amazon Technologies, Inc., Seattle, WA (US)

(72) Inventors: Alex Friedman, Hadera (IL); Sergei Dyshel, Ramat Gan (IL); Ofir Dahan, Holon (IL); Alex Liakhovetsky, Ra'anana (IL)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 16/120,263

(22) Filed: Sep. 2, 2018

(65) Prior Publication Data

US 2019/0082010 A1    Mar. 14, 2019

Related U.S. Application Data

(60) Provisional application No. 62/556,511, filed on Sep. 11, 2017.

(51) Int. Cl.
*G06F 16/23* (2019.01)
*G06F 16/176* (2019.01)
(Continued)

(52) U.S. Cl.
CPC .......... *G06F 16/2343* (2019.01); *G06F 3/067* (2013.01); *G06F 3/0619* (2013.01);
(Continued)

(58) Field of Classification Search
CPC ............. G06F 16/2343; G06F 16/1774; G06F 16/2336; G06F 3/067; G06F 3/0689; H04L 67/1097
See application file for complete search history.

(56) References Cited

U.S. PATENT DOCUMENTS 6,446,220 B1    9/2002    Menon
6,584,517 B1    6/2003    Raza
(Continued)

FOREIGN PATENT DOCUMENTS

WO    2013024485 A2    2/2013

OTHER PUBLICATIONS

Kalia et al., "Using RDMA Efficiently for Key-Value Services", Proceedings of the 2014 ACM conference on SIGCOMM, 15 pages, Aug. 17-22, 2014.
(Continued)

*Primary Examiner* — Joseph D Torres
(74) *Attorney, Agent, or Firm* — Robert C. Kowert; Kowert, Hood, Munyon, Rankin & Goetzel, P.C.

(57) ABSTRACT

A method for data storage, in a system that includes multiple servers, multiple multi-queue storage devices and at least one storage controller that communicate over a network, includes receiving in a server, from an application running on the server, a request to access data belonging to one or more stripes. The stripes are stored on the storage devices and are shared with one or more other servers. In response to the request, the following are performed at least partially in parallel: (i) requesting one or more global locks that prevent the other servers from accessing the stripes, and (ii) reading at least part of the stripes from the storage devices speculatively, irrespective of whether the global locks are granted. Execution of the request is completed upon verifying that the speculatively-read data is valid.

15 Claims, 3 Drawing Sheets

(51) Int. Cl.
  *G06F 3/06* (2006.01)
  *H01L 29/08* (2006.01)
  *G06F 11/10* (2006.01)
  *H04L 29/08* (2006.01)

(52) U.S. Cl.
  CPC .......... *G06F 3/0659* (2013.01); *G06F 3/0689* (2013.01); *G06F 11/1076* (2013.01); *G06F 16/1774* (2019.01); *G06F 16/2308* (2019.01); *G06F 16/2336* (2019.01); *H04L 67/1097* (2013.01)

(56) References Cited

U.S. PATENT DOCUMENTS

| | | | |
|---|---|---|---|
| 7,406,473 B1* | 7/2008 | Brassow | H04L 67/1097 |
| 7,647,443 B1* | 1/2010 | Chatterjee | G06F 3/0622 |
| | | | 710/200 |
| 7,870,265 B2* | 1/2011 | Kramer | H04L 67/1008 |
| | | | 709/227 |
| 7,958,304 B1* | 6/2011 | Goel | G06F 11/1096 |
| | | | 711/114 |
| 8,001,580 B1* | 8/2011 | Hyer, Jr. | G06F 16/1774 |
| | | | 726/2 |
| 8,095,763 B2 | 1/2012 | Piszczek et al. | |
| 8,510,265 B1 | 8/2013 | Boone et al. | |
| 8,595,385 B1 | 11/2013 | Shapiro et al. | |
| 8,725,934 B2 | 5/2014 | Batwara et al. | |
| 8,812,450 B1 | 8/2014 | Kesavan et al. | |
| 8,897,315 B1 | 11/2014 | Arad et al. | |
| 9,112,890 B1 | 8/2015 | Ori | |
| 9,164,689 B2 | 10/2015 | O'Brien | |
| 9,251,052 B2 | 2/2016 | Talagala et al. | |
| 9,274,720 B1* | 3/2016 | Ori | G06F 3/0653 |
| 9,525,737 B2 | 12/2016 | Friedman | |
| 9,529,542 B2 | 12/2016 | Friedman et al. | |
| 9,842,084 B2 | 12/2017 | Freindman et al. | |
| 10,031,872 B1 | 7/2018 | Friedman | |
| 2002/0103923 A1 | 8/2002 | Cherian et al. | |
| 2003/0028725 A1 | 2/2003 | Naberhuis et al. | |
| 2003/0067942 A1 | 4/2003 | Altenbernd et al. | |
| 2003/0105830 A1 | 6/2003 | Pham et al. | |
| 2003/0159083 A1 | 8/2003 | Fukuhara et al. | |
| 2004/0068558 A1 | 4/2004 | De Miguel | |
| 2004/0133650 A1* | 7/2004 | Miloushev | G06F 16/1824 |
| | | | 709/213 |
| 2004/0153576 A1 | 8/2004 | Hansmann et al. | |
| 2005/0050273 A1 | 3/2005 | Horn et al. | |
| 2006/0031450 A1 | 2/2006 | Unrau et al. | |
| 2006/0179197 A1 | 8/2006 | Chung et al. | |
| 2007/0050591 A1 | 3/2007 | Boyd et al. | |
| 2007/0143477 A1* | 6/2007 | Kaminsky | G06F 9/526 |
| | | | 709/225 |
| 2007/0165625 A1 | 7/2007 | Eisner et al. | |
| 2007/0168396 A1 | 7/2007 | Adams et al. | |
| 2008/0195617 A1* | 8/2008 | Holt | G06F 9/526 |
| 2008/0215701 A1* | 9/2008 | Holt | G06F 9/526 |
| | | | 709/213 |
| 2010/0153617 A1 | 6/2010 | Miroshnichenko et al. | |
| 2010/0250831 A1 | 9/2010 | O'Brien et al. | |
| 2011/0060887 A1 | 3/2011 | Thatcher et al. | |
| 2011/0246720 A1 | 10/2011 | Nakamura et al. | |
| 2011/0296133 A1 | 12/2011 | Flynn et al. | |
| 2012/0078978 A1 | 3/2012 | Shoolman et al. | |
| 2012/0079318 A1 | 3/2012 | Colgrove et al. | |
| 2012/0144110 A1 | 6/2012 | Smith | |
| 2012/0233396 A1 | 9/2012 | Flynn et al. | |
| 2013/0031234 A1 | 1/2013 | Alfano et al. | |
| 2013/0046949 A1 | 2/2013 | Colgrove et al. | |
| 2013/0138836 A1 | 5/2013 | Cohen et al. | |
| 2013/0179649 A1 | 7/2013 | Green et al. | |
| 2013/0198312 A1 | 8/2013 | Tamir et al. | |
| 2013/0275447 A1 | 10/2013 | Ben-Tsion et al. | |
| 2014/0040411 A1 | 2/2014 | Weber et al. | |
| 2014/0089545 A1* | 3/2014 | Samanta | G06F 13/14 |
| | | | 710/200 |
| 2014/0136808 A1 | 5/2014 | Colgrove et al. | |
| 2014/0189032 A1 | 7/2014 | Sugimoto et al. | |
| 2014/0195849 A1 | 7/2014 | Parladori et al. | |
| 2014/0245444 A1 | 8/2014 | Lutas et al. | |
| 2014/0289462 A9 | 9/2014 | Malwankar | |
| 2014/0304525 A1 | 10/2014 | Novak | |
| 2015/0012699 A1 | 1/2015 | Rizzo et al. | |
| 2015/0026417 A1* | 1/2015 | Guo | H04L 29/08 |
| | | | 711/145 |
| 2015/0127923 A1 | 5/2015 | Miller et al. | |
| 2015/0149819 A1* | 5/2015 | Lee | G06F 11/1076 |
| | | | 714/6.24 |
| 2015/0212752 A1 | 7/2015 | Nemazie et al. | |
| 2015/0227602 A1 | 8/2015 | Ramu et al. | |
| 2015/0379009 A1 | 12/2015 | Reddy | |
| 2016/0004642 A1 | 1/2016 | Sugimoto et al. | |
| 2016/0026652 A1 | 1/2016 | Zheng | |
| 2016/0034418 A1 | 2/2016 | Romem et al. | |
| 2016/0057224 A1 | 2/2016 | Ori | |
| 2016/0134703 A1 | 5/2016 | Ori | |
| 2016/0154834 A1 | 6/2016 | Friedman | |
| 2016/0162209 A1 | 6/2016 | Calderone | |
| 2016/0231948 A1 | 8/2016 | Gupta et al. | |
| 2016/0366226 A1 | 12/2016 | Friedman et al. | |
| 2018/0060274 A1 | 3/2018 | Friedman et al. | |

OTHER PUBLICATIONS

NVM Express, Revision 1.2, 205 pages, Nov. 3, 2014.
NVM Express, Revision 1.2a, 209 pages, Oct. 23, 2015.
Mitchell et al., "Using One-Sided RDMA Reads to Build a Fast,CPU-Efficient Key-Value Store", USENIX Annual Technical Conference, pp. 103-114, Jun. 26-28, 2013.
Rodeh, O., "B-trees, Shadowing, and Clones", ACM Transactions on Storage, vol. 3, No. 4, article 15, 27 pages, Feb. 2008.
Rodeh, O., "B-trees, Shadowing, and Clones", 2007 Linux Storage & Filesystem Workshop, San Jose, USA, 51 pages, Feb. 12-13, 2007.
Rodeh et al., "BTRFS: The Linux B-Tree Filesystem", ACM Transactions on Storage, vol. 9, No. 3, article 9, 32 pages, Aug. 2013.
Lim, et al., "SILT: A memory-efficient, high-performance key-value store", Proceedings of the 23rd ACM Symposium on Operating Systems Principles, 13 pages, year 2011.
Behringer et al., "Memory Management for Concurrent RDMA: A Design for a Key-Value Store", 86 pages, Jun. 3, 2014.
U.S. Appl. No. 15/168,055 office action dated Sep. 25, 2018.
U.S. Appl. No. 15/168,055 office action dated Apr. 5, 2019.

* cited by examiner

SHARED VOLUMES IN DISTRIBUTED RAID OVER SHARED MULTI-QUEUE STORAGE DEVICES

CROSS-REFERENCE TO RELATED APPLICATIONS

This application claims the benefit of U.S. Provisional Patent Application 62/556,511, filed Sep. 11, 2017, whose disclosure is incorporated herein by reference.

FIELD OF THE INVENTION

The present invention relates generally to data storage, and particularly to methods and systems for distributed storage.

BACKGROUND OF THE INVENTION

Various techniques for distributed data storage are known in the art. For example, U.S. Pat. No. 9,800,661, whose disclosure is incorporated herein by reference, describes a method for data storage including, in a system that includes one or more storage controllers, multiple servers and multiple multi-queue storage devices, assigning in each storage device server-specific queues for queuing data-path storage commands exchanged with the respective servers. At least some of the data-path storage commands are exchanged directly between the servers and the storage devices, not via the storage controllers, to be queued and executed in accordance with the corresponding server-specific queues.

SUMMARY OF THE INVENTION

An embodiment of the present invention that is described herein provides a method for data storage in a system that includes multiple servers, multiple multi-queue storage devices and at least one storage controller that communicate over a network. The method includes receiving in a server, from an application running on the server, a request to access data belonging to one or more stripes. The stripes are stored on the storage devices and are shared with one or more other servers. In response to the request, the following are performed at least partially in parallel: (i) requesting one or more global locks that prevent the other servers from accessing the stripes, and (ii) reading at least part of the stripes from the storage devices speculatively, irrespective of whether the global locks are granted. Execution of the request is completed upon verifying that the speculatively-read data is valid.

In some embodiments, upon finding that the speculatively-read data is not all valid, the method includes re-reading the at least part of the stripes from the storage devices after the global locks are granted. In an embodiment, the request from the application includes a request to read the data, and reading the stripes speculatively includes reading the requested data from the storage devices.

In other embodiments, the request includes a request to write given data in place of previous data, and reading the stripes speculatively includes reading from the stripes (i) data other than the given data, and (ii) redundancy information. In an embodiment, when the other data and the redundancy information have been read speculatively and are valid, completing to execute the request includes recalculating the redundancy information, and writing the given data and the recalculated redundancy information to the stripes on the storage devices. In another embodiment, when the other data and the redundancy information have been read speculatively but are not all valid, the method includes completing to execute the request by re-reading the other data and the redundancy information, recalculating the redundancy information, and writing the given data and the recalculated redundancy information to the stripes on the storage devices.

In yet another embodiment, the method further includes assessing a time that elapsed between requesting the global locks and receiving a notification that the global locks are granted, and, if the time that elapsed exceeds a predefined time-out, regarding the speculatively-read at least part of the stripes as invalid, even though the global locks have been granted.

There is additionally provided, in accordance with an embodiment of the present invention, a method for data storage in a system that includes multiple servers, multiple multi-queue storage devices and at least one storage controller that communicate over a network. The method includes receiving in the storage controller, from a server, a request to apply a global lock on a stripe of data stored on the storage devices. The request is granted only when (i) no global lock is currently applied on the stripe, and (ii) the stripe was not globally locked for write operations for at least a predefined time period prior to arrival of the request.

There is further provided, in accordance with an embodiment of the present invention, a server including a network interface and a processor. The network interface is configured to communicate over a network with multiple multi-queue storage devices and at least one storage controller. The processor is configured to receive, from an application running on the server, a request to access data belonging to one or more stripes, wherein the stripes are stored on the storage devices and are shared with one or more other servers, to perform at least partially in parallel, in response to the request, perform (i) requesting one or more global locks that prevent the other servers from accessing the stripes, and (ii) read at least part of the stripes from the storage devices speculatively, irrespective of whether the global locks are granted, and, upon verifying that the speculatively-read data is valid, to complete to execute the request.

There is further provided, in accordance with an embodiment of the present invention, a storage controller including a network interface and a processor. The network interface is configured to communicate over a network with multiple multi-queue storage devices and multiple servers. The processor is configured to receive, from a server, a request to apply a global lock on a stripe of data stored on the storage devices, and to grant the request only when (i) no global lock is currently applied on the stripe, and (ii) the stripe was not globally locked for write operations for at least a predefined time period prior to arrival of the request.

The present invention will be more fully understood from the following detailed description of the embodiments thereof, taken together with the drawings in which:

DETAILED DESCRIPTION OF EMBODIMENTS

Overview

Figure 1:
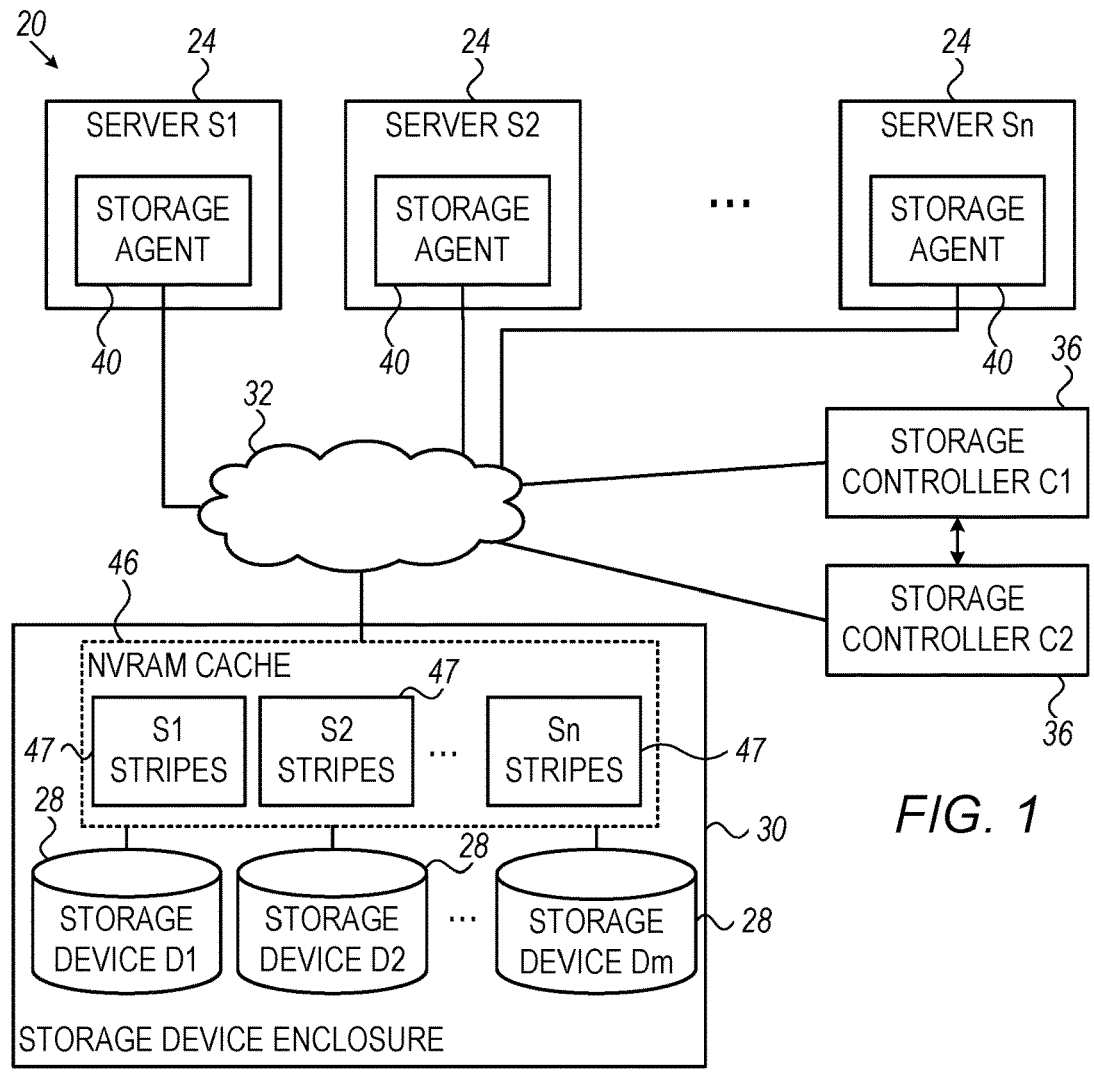
FIG. 1 is a block diagram that schematically illustrates a computing system that uses distributed data storage, in accordance with an embodiment of the present invention.

Embodiments of the present invention that are described herein provide improved methods and systems for distributed data storage. The disclosed techniques are typically implemented in a computing system comprising multiple servers that store data in multiple shared multi-queue storage devices, and one or more storage controllers. The servers run storage agents that execute storage commands in the storage devices on behalf of user applications.

Among other tasks, the storage agents perform logical-to-physical address translation and implement a redundant storage scheme such as RAID. In accordance with the redundant storage scheme, the data is stored on the storage devices in stripes. Each stripe comprises multiple data blocks, and one or more parity blocks (also referred to as redundancy blocks) calculated over the data blocks of the stripe.

In some embodiments, the stored data is arranged in user volumes (referred to simply as "volumes" herein), and are exposed to user applications using user-volume addresses. A given volume may be shared by multiple servers. Unless accounted for, sharing of volumes may cause data inconsistencies due to uncoordinated access to the same stripe by different servers. The techniques described herein prevent such inconsistencies, and at the same time cause only minimal degradation in performance, e.g., latency and throughput.

In some disclosed embodiments, access to shared volumes is coordinated by a distributed global locking mechanism deployed on the storage controllers. The global locking mechanism enables locking per stripe or per group of stripes, so that only the server that obtained the lock is permitted to access the stripe or stripes in question. Locking is performed for both reading and writing.

In an example read process, a storage agent in a certain server receives a request from a user application to read data that is stored on the storage devices. The data may belong to one or more stripes. In response to the request, the storage agent requests global locks on the relevant stripes. In order to reduce latency, however, the storage agent does not wait for the global locks to be granted. Instead, the storage agent issues read commands to the storage devices, at least partly in parallel with the locking process.

The read commands are speculative, in the sense that the subsequent reply from the global locking mechanism might indicate that the read data is invalid. In an embodiment, the global locking mechanism replies to the lock request in one of two possible ways. A first possible reply indicates to the storage agent that the stripes are not currently under lock, and that the speculatively-read data is valid. In this case, the global locking mechanism does not actually lock the stripes. In response to this type of reply, the storage agent returns the speculatively-read data to the requesting application. A second possible reply indicates that the global locking mechanism has now locked the stripes in order to serve the request, but that the speculatively-read data is invalid. In response to this type of reply, the storage agent discards the speculatively-read data, and re-reads the data from the storage devices. In this manner, different servers are prevented from accessing the same stripe concurrently. In the vast majority of cases, the speculative readout is successful, and no additional latency is incurred by the locking process.

Global locking may also be used when writing to a shared volume. In an example write process, a storage agent in a certain server receives a request from a user application to write data to the storage devices. Again, the data may belong to one or more stripes. Unless the write operation completely overwrites entire stripes, the storage agent first has to perform a read-before-write operation in order to be able to update the parity blocks of the stripes.

Thus, in an embodiment, the storage agent requests global locks on the relevant stripes, and at least partly in parallel performs the read-before-write operation. The read-before-write operation is considered speculative, because the data is read before a lock is obtained on the stripes in question. Upon receiving a write request, the global locking mechanism obtains a write lock on the relevant stripes, and only then replies. In addition to indicating that the locks have been granted, the reply also indicates to the storage agent whether the speculatively-read data is valid or not. If the speculatively-read data is valid, the storage agent proceeds with the writing process, i.e., recalculates the parity blocks and writes the data and parity. If the speculatively-read data is not valid, the storage agent discards the speculatively-read data, performs the read-before-write operation again, and completes the write operation. In the disclosed write process, too, the global locking process incurs little or no extra latency, due to the speculative readout.

Several example implementations of global locks are described herein, with particular emphasis on low latency and scalability. Other embodiments refer to the use of a Non-Volatile Random Access Memory (NVRAM) cache, also referred to as a "staging RAM," which is used as an intermediate stage that accumulates RAID stripes between the servers and the storage devices. Yet other embodiments refer to journaling of operations, and recovery from "write holes" and other failures using the journals. The possible use of multiple Data-Path (DP) instances per server is also addressed.

System Description

FIG. 1 is a block diagram that schematically illustrates a computing system 20, in accordance with an embodiment of the present invention. System 20 may comprise, for example, a data center, a High-Performance Computing (HPC) cluster, or any other suitable system. System 20 comprises multiple servers 24 (also referred to as hosts) denoted S1 . . . Sn, and multiple storage devices 28 denoted D1 . . . Dm. The servers and storage devices are interconnected by a communication network 32. The system further comprises one or more storage controllers 36 that manage the storage of data in storage devices 28.

In the disclosed techniques, data-path operations such as writing and readout are performed directly between the servers and the storage devices, without having to trigger or run code on the storage controller CPUs. The storage controller CPUs are involved only in relatively rare control-path operations. Computing systems of this sort are also described, for example, in U.S. Pat. Nos. 9,112,890, 9,274,720, 9,519,666, 9,521,201, 9,525,737 and 9,529,542, whose disclosures are incorporated herein by reference.

In the disclosed embodiments, each storage device 28 is a multi-queue storage device, e.g., an NVMe SSD. Each storage device 28 provides multiple server-specific queues for storage commands. In other words, a given storage device 28 queues the storage commands received from each server 24 in a separate respective server-specific queue. The storage devices typically have the freedom to queue, schedule and reorder execution of storage commands.

In the present example, although not necessarily, storage devices 28 are comprised in a storage-device enclosure 30, e.g., a rack, drawer or cabinet. Enclosure 30 further comprises a Non-Volatile Random Access Memory (NVRAM) cache unit 46. Unit 46, referred to herein simply as "NVRAM cache," is used by servers 24 as a front-end for accumulating data in stripes 47, e.g., RAID stripes, before transferring the stripes for storage in storage devices 28. Transfer of stripes from NVRAM cache 46 to storage devices 28 is referred to herein as "destaging." Enclosure 30 may also comprise its own Central Processing Unit (CPU—not shown).

NVRAM cache 46 may be implemented using any suitable NVRAM devices or configurations, for example using a volatile memory such as Dynamic RAM (DRAM) or Static RAM (SRAM) that is backed-up by a temporary power source such as a battery or capacitor. Another non-limiting example on an NVRAM is a DRAM backed-up by a Flash memory.

Storage-related functions in each server 24 are carried out by a respective storage agent 40. Agents 40 typically comprise software modules installed and running on the respective servers. In some embodiments, agent 40 in each server 24 maintains one or more respective queues per storage device 28, corresponding to the respective server-specific queues of the storage devices. (For example, in a server that comprises multiple CPU cores, agent 40 may maintain a respective queue per storage device per CPU core, or per storage device per group of CPU cores.) Agents 40 and storage devices 28 are permitted to reorder storage commands in the queues. The queues in a given agent 40 typically have no visibility outside the context of the respective server.

Servers 24 may comprise any suitable computing platforms that run any suitable applications. In the present context, the term "server" includes both physical servers and virtual servers. For example, a virtual server may be implemented using a Virtual Machine (VM) that is hosted in some physical computer. Thus, in some embodiments multiple virtual servers may run in a single physical computer. Storage controllers 36, too, may be physical or virtual. In an example embodiment, the storage controllers may be implemented as software modules that run on one or more physical servers 24.

Storage devices 28 may comprise any suitable storage medium, such as, for example, Solid State Drives (SSD), Non-Volatile Random Access Memory (NVRAM) devices or Hard Disk Drives (HDDs). Typically, as explained above, storage devices 28 are multi-queue storage devices such as NVMe SSDs. Network 32 may operate in accordance with any suitable communication protocol, such as Ethernet or Infiniband. As explained above, the disclosed techniques are typically implemented using RDMA, DMA or similar remote direct memory access schemes.

Generally, system 20 may comprise any suitable number of servers, storage devices and storage controllers. In the present example, the system comprises two storage controllers denoted C1 and C2, for resilience. One of the storage controllers is defined as primary, while the other controller serves as hot backup and can replace the primary storage controller in case of failure.

In the embodiments described herein, the assumption is that any server 24 is able to communicate with any storage device 28, but there is no need for the servers to communicate with one another. Storage controllers 36 are assumed to be able to communicate with all servers 24 and storage devices 28, as well as with one another.

The configuration of system 20 shown in FIG. 1 is an example configuration, which is chosen purely for the sake of conceptual clarity. In alternative embodiments, any other suitable system configuration can be used. For example, NVRAM cache unit 46 may be located in any other suitable location in the system, not necessarily coupled to storage devices 28.

The different system elements may be implemented using suitable hardware, using software, or using a combination of hardware and software elements. Each server 24 typically comprises a suitable network interface for communicating over network 32, e.g., with the NVRAM cache, storage devices and/or storage controllers, and a suitable processor that carries out the various server functions. Each storage controller 36 typically comprises a suitable network interface for communicating over network 32, e.g., with the storage devices and/or servers, and a suitable processor that carries out the various storage controller functions.

In some embodiments, servers 24 and/or storage controllers 36 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2:
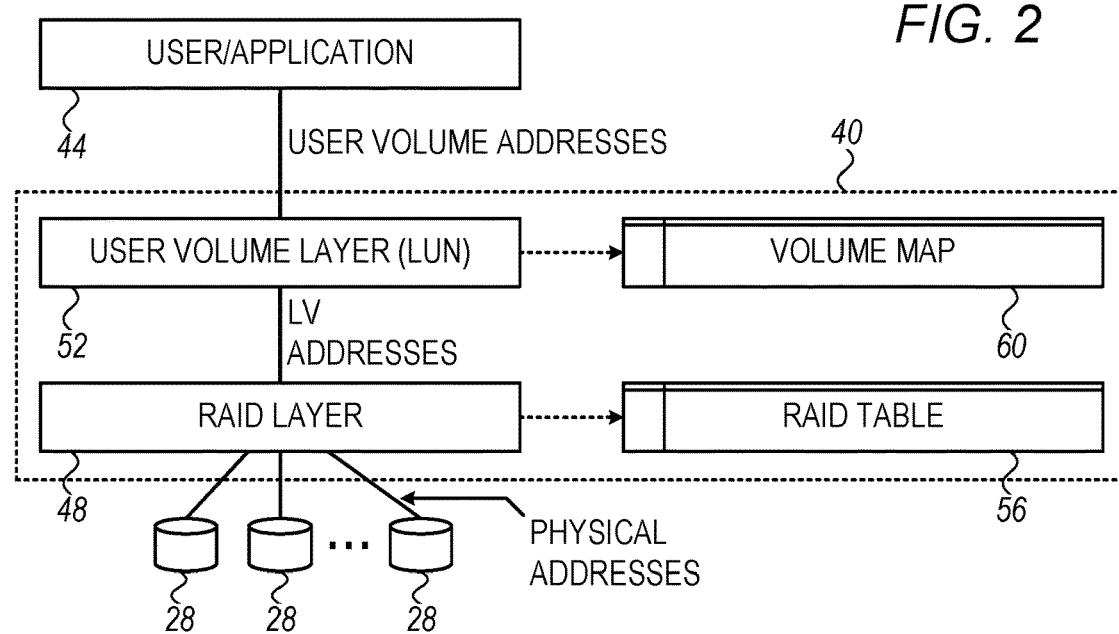
FIG. 2 is a block diagram that schematically illustrates elements of a storage agent, in accordance with an embodiment of the present invention.

FIG. 2 is a block diagram that schematically illustrates elements of storage agent 40, in accordance with an embodiment of the present invention. A respective storage agent of this sort typically runs on each server and performs storage-related functions for user applications 44 running on the server. As noted above, servers 24 may comprise physical and/or virtual servers. Thus, a certain physical computer may run multiple virtual servers 24, each having its own respective storage agent 40.

In the disclosed embodiments, each storage agent 40 comprises a Redundant Array of Independent Disks (RAID) layer 48 and a user-volume layer 52. RAID layer 48 carries out a redundant storage scheme over storage devices 28, including handling storage resiliency, detection of storage device failures, rebuilding of failed storage devices and rebalancing of data in case of maintenance or other evacuation of a storage device. RAID layer 48 also typically stripes data across multiple storage devices 28 for improving storage performance.

In one simple example embodiment, RAID layer 48 implements a RAID-10 scheme, i.e., replicates and stores two copies of each data item on two different storage devices 28. One of the two copies is defined as primary and the other as secondary. The primary copy is used for readout as long as it is available. If the primary copy is unavailable, for example due to storage-device failure, the RAID layer reverts to read the secondary copy. Other examples described below use RAID-6, in which data is stored in stripes that each comprises multiple data blocks and two parity blocks.

Alternatively, RAID layer 48 may implement any other suitable redundant storage scheme (RAID-based or otherwise), such as schemes based on erasure codes. The description that follows uses the terms "redundancy" and "parity" interchangeably. The redundancy or parity may be calculated over the data in any suitable way, such as using XOR or a suitable error correction code. In some embodiments, a T10-PI scheme or other data-integrity protection scheme may be implemented on top of the redundant storage scheme.

RAID layer 48 accesses storage devices 28 using physical addressing. In other words, RAID layer 48 exchanges with storage devices 28 read and write commands, as well as responses and retrieved data, which directly specify physical addresses (physical storage locations) on the storage devices. In this embodiment, all logical-to-physical address translations are performed in agents 40 in the servers, and none in the storage devices.

The RAID layer maps between physical addresses and Logical Volumes (LVs) to be used by user-volume layer 52. In a RAID-10 configuration, for example, each LV is mapped to two or more physical-address ranges on two or more different storage devices. The two or more ranges are used for storing the replicated copies of the LV data as part of the redundant storage scheme.

The redundant storage scheme (e.g., RAID) is thus hidden from user-volume layer 52. Layer 52 views the storage medium as a set of guaranteed-storage LVs. User-volume layer 52 is typically unaware of storage device failure, recovery, maintenance and rebuilding, which are handled transparently by RAID layer 48. (Nevertheless, some optimizations may benefit from such awareness by layer 52. For example, there is no need to rebuild unallocated storage space.)

User-volume layer 52 provides storage resources to applications 44 by exposing user volumes that are identified by respective Logical Unit Numbers (LUNs). The terms "user volume" and "LUN" are used interchangeably herein. In other words, a user application 44 views the storage system as a collection of user volumes, and issues storage commands having user-volume addresses.

Storage agent 40 translates between the different address spaces using a RAID table 56 and a volume map 60. RAID table 56 holds the translation between LV addresses and physical addresses, and volume map 60 holds the translation between user-volume addresses and LV addresses.

In the embodiments described herein, the user-volume addresses are also referred to as User Block Addresses (UBAs) and the LV addresses are also referred to as RAID Block Addresses (RBAs). Thus, RAID layer 48 in each server 24 translates between UBAs and RBAs.

In the description that follows, the basic storage unit in the RBA space is a RAID page, e.g., a 512B, 4 KB or 32 KB page, for example. The terms "page" and "block" are used interchangeably herein. In alternative embodiments, any suitable page size can be used. Each RAID page has a respective RAID Page Descriptor (RPD). The RPD of a RAID page specifies whether the RAID page is currently cached in NVRAM cache 46 or stored in storage devices 28, and the exact location of the RAID page in the cache or on the storage devices.

In some embodiments, the overall RBA space is divided into two or more chunks of size CS, and the disclosed technique may be applied separately per chunk. This implementation reduces the address space within each chunk, and therefore reduces the number of bits required to address memory blocks. The total memory size required for storing metadata is thus reduced. In some embodiments such chunks may be assigned adaptively to servers 24, e.g., for distributing background tasks such as garbage collection.

Typically, any server 24 may attach to any user volume. A given user volume may have multiple servers attached thereto. In some embodiments, storage controllers 36 define and maintain a global volume map that specifies all user volumes in system 20. Volume map in each storage agent 40 comprises a locally-cached copy of at least part of the global volume map. In agent 40 of a given server, volume map 60 holds at least the mapping of the user volumes (LUNs) to which this server is attached. In an embodiment, volume map 60 supports thin provisioning.

In the present context, a single instance of RAID layer 48, user volume layer 52, RAID table 56 and volume map 60 are referred to collectively as a Data-Path (DP) instance. In some embodiments, a certain server may run multiple DP instances simultaneously. Aspects of running multiple DP instances in the same server are addressed, for example, in U.S. Patent Application Publication 2018/0210848, which is assigned to the assignee of the present patent application and whose disclosure is incorporated herein by reference.

In some embodiments, each server 24 is assigned a respective area in NVRAM cache 46 for storing a respective set of RAID stripes 47. Servers 24 typically write to and read from NVRAM cache 46 using RDMA. The areas assigned to servers S1, S2, . . . , Sn are shown in FIG. 1 as "S1 stripes", "S2 stripes", . . . , "Sn stripes", respectively. Each RAID stripe has a respective RAID Stripe Descriptor (RSD).

Typically, storage controllers 36 assign each agent a pool of free NVRAM cache pages. Agent 40 obtains additional free NVRAM cache pages from the storage controllers as needed. Agent 40 of each server 24 uses its assigned area as a write combining cache, i.e., gradually accumulates data pages that are en-route to storage.

The NVRAM cache area of a given server is typically distributed over multiple failure domains. Agent 40 typically acknowledges completion of a write command only after at least two copies of the data page in question have been cached in NVRAM cache pages on at least two failure domains. Depending on system requirements, a larger number of copies may be stored.

Typically, each agent 40 manages its respective area in NVRAM cache 46. Among other management tasks, agents 40 perform a "cleanup" process, e.g., upon server failure or unmapping. This process is described below.

The size of a stripe is N+C pages, wherein N denotes the number of data pages per stripe, and C denotes the number of redundancy pages per stripe. The size of the cache area assigned to a given server is typically a multiple of the stripe size, at least a single stripe and typically several stripes. A large cache area per server allows agent 40 to accumulate several stripes before destaging them to storage devices 28, thereby improving performance. In Flash-based storage devices, for example, accumulating several stripes may allow destaging at a granularity of the erasure-block or clustered-block of the storage device, so as to considerably improve the endurance and performance of the storage device. In some embodiments, a larger NVRAM cache with some replacement policy (e.g., Least Recently Used—LRU) may also be implemented.

As will be described below, in some embodiments NVRAM cache 46 is also used as a read cache, e.g., for reducing read latency and increasing storage throughput. Each server typically manages its read cache separately and autonomously using RDMA, using some replacement policy such as LRU. Each server may perform garbage collection to its read cache, to remove memory pages that are no longer referenced.

In some embodiments, when the CPU of a server comprises multiple CPU cores, an NVRAM cache area may be assigned separately to each CPU core, for reducing contention on the server side.

In some embodiments, NVRAM cache 46 may be distributed among storage devices 28, e.g., by equally splitting the cache among the storage device and allocating an equal portion on each storage device, while preserving the replication on different failure domains. In other embodiments, NVRAM cache 46 may reside, in a mirrored configuration, on storage controllers 36. As yet another example, NVRAM cache 46 may be distributed among servers 24, again preserving replication on different failure domains.

Typically, each memory page in NVRAM cache 46 (referred to as a "NVRAM cache page" or "cache page") has a respective Cache Page Descriptor (CPD). The CPDs are also replicated with the cache pages. Each CPD specifies a back-reference to the RPD that most recently mapped it.

Data Storage in Shared Volumes Using Global Locks

As noted above, a given user volume may be shared, i.e., have multiple servers attached thereto. Sharing of volumes is a challenge for data consistency, and even more so when combined with RAID. When using RAID, for example, it is necessary to prevent concurrent access of different servers to the same stripe, not only to the same data block.

In some embodiments, a distributed global locking mechanism (also referred to simply as a "global lock" for brevity) is deployed on storage controllers 36 for this purpose. The global lock is configured to receive from agents 40 on servers 24 requests for locking a stripe or a group of stripes, and to grant a lock on a given stripe to a single server at a time.

The global lock can be implemented on controllers 36 in various ways. In an embodiment, a predefined memory region of a storage controller 36 is shared among multiple servers 24 (e.g., all servers) using RDMA. Each stripe or group of stripes is represented by one or more bits in this memory region. Agents 40 lock and unlock stripes using RDMA atomic compare-and-swap operations, retrying as needed until the lock/unlock is successful. This implementation is highly scalable, and also has the benefit of not triggering or running code on the storage controller CPU.

In another embodiment, a global locking mechanism is implemented by running on storage controllers 36 one or more dedicated lock servers that receive and respond to lock requests from agents 40. Each lock request identifies the requesting server and the stripe or stripes it wishes to lock. In an embodiment, a lock request specifies (i) an ID of the storage operation (I/O) that caused the lock request, (ii) a Boolean value specifying whether the request is for a write or a read lock, and (iii) the stripe ranges affected by this I/O (multiple disjoint ranges may be supported in this manner). The lock server uses the data in the lock request to record the lock in its local data structures. In an embodiment, the data structures may comprise a hash table keyed by stripe ID and containing lock descriptors. A lock response typically comprises a lock handle that is used by the server in identifying the lock when sending a subsequent unlock command.

When system 20 comprises multiple (e.g., two) storage controllers 36, stripes may be sharded (e.g., by stripe ID) among the different controllers such that each shard (subset of stripes) is owned by a single controller 36. Ownership of stripes may be transferred from one controller 36 to another, e.g., in case of controller failure or for any other reason. The global lock mechanism may be sharded, e.g., multiple lock-server instances (threads) may run on each storage controller 36. This implementation allows scaling to higher performance and smaller lock latency. Shards are typically chosen to be larger than the maximum I/O size, such that locking is performed vis-à-vis only a single shard for aligned I/Os, and up to two shards for unaligned I/Os.

Further alternatively, the global lock mechanism may be implemented in any other suitable way.

In some embodiments, a certain server 24 also applies local locking (intra-server locking) on stripes or groups of stripes, for preventing different DPs on the same server, or different I/Os of the same DP, from accessing the same stripe concurrently.

Alternatively to local locking, a server running multiple DPs may apply a sharding mechanism, in which storage commands of different DPs will never address the same stripe. In other words, the sharding mechanism assigns different stripes to different DPs. Any suitable sharding scheme can be used for this purpose, e.g., based on modulo calculation, random or pseudo-random assignment, or any other scheme. Further alternatively, a server running multiple DPs may use a local write-combining cache.

In the embodiments described herein, global locking is performed for both read and write operations. Global locking for read operations is needed, for example, when agents 40 acknowledge completion of write operations to user applications 44 once the data has been written to staging RAM 46 (without waiting for the data to be committed to storage devices 28). In alternative embodiments, however, read locking may be omitted, e.g., by allowing servers to read data directly from each other's staging RAM.

Mitigating Latency of Global Lock Using Speculative Readout

As can be appreciated, the process of requesting and obtaining a global lock increases the latency of accessing a stripe. This latency may cause considerable degradation in system performance. In some embodiments, agents 40 minimize the performance degradation by using speculative readout, as will be explained below. The description that follows demonstrates the use of speculative readout in read and write operations. The disclosed techniques, however, can be used in any other storage operation that modifies the data in a stripe.

Figure 3:
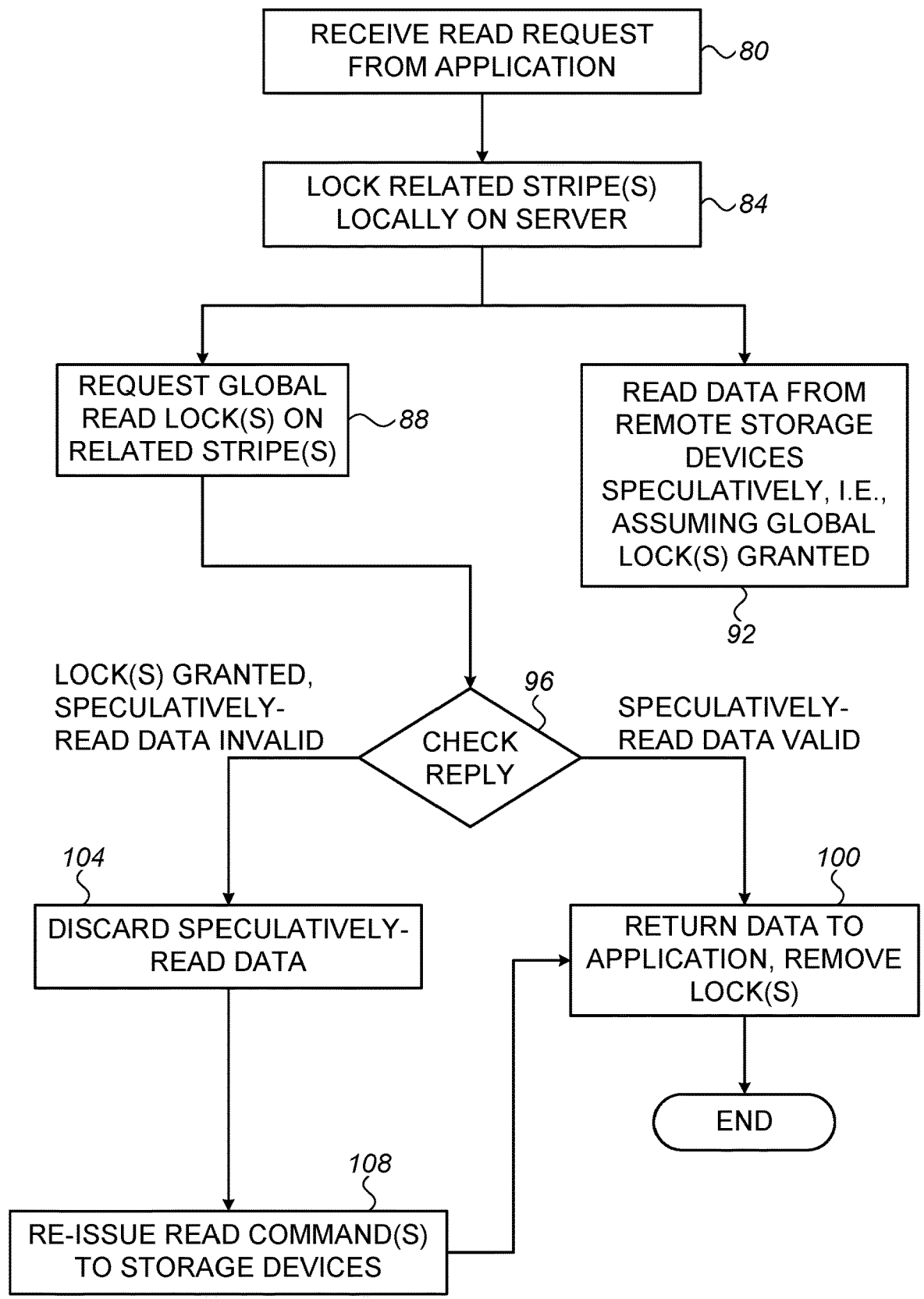
FIG. 3 is a flow chart that schematically illustrates a method for readout from a shared volume, in accordance with an embodiment of the present invention.

FIG. 3 is a flow chart that schematically illustrates a method for readout from a shared volume, in accordance with an embodiment of the present invention. The method of FIG. 3 is carried out by agent 40 in a certain server 24. The method begins with agent 40 receiving a read request from a user application 44, at a read requesting step 80. The read request typically specifies a range of user-volume addresses that are to be read. The addresses may belong to one or more stripes.

Agent 40 first locks the relevant stripes locally, at a local locking 84, to ensure that the stripes are not accessed simultaneously for serving another I/O. After performing local locking, agent 40 performs two actions at least partially in parallel:

Agent 40 requests a global read lock on the relevant stripes, at a global lock requesting step 88. Step 88 may involve sending one or more lock requests to the global lock mechanism on storage controllers 36.

Agent 40 issues one or more read commands that read the requested data (the data requested in the read request at step 80) from storage devices 28, at a speculative readout step 92.

At a reply checking step 96, agent 40 checks the reply received from the global lock mechanism. Two types of reply are possible, depending on whether the stripes in question are currently under lock for serving another server. If the stripes are not under write lock, the global locking mechanism sends a first type of reply, which indicates that the speculatively-read data is valid. In this case, the global locking mechanism does not actually lock the stripes. If the stripes are currently locked for another server, the global locking mechanism waits until they are unlocked, and then locks them and sends a second type of reply. The latter type of reply indicates that the stripes have been locked in order to serve the request, but that the speculatively-read data is invalid.

If, at step 96, storage agent 40 finds that the reply is of the first type (i.e., the speculatively-read data is valid), agent 40 sends the read data to the requesting user application, and removes the local locks on the relevant stripes, at a read completion step 100. The method then terminates.

Otherwise, i.e., if storage agent 40 finds that the reply is of the second type (i.e., the speculatively-read data is invalid), agent 40 discards the speculatively-read data, at a discarding step 104, re-reads the data from storage devices 28, at a re-reading step 108, and proceeds to complete the readout process at step 100.

It is noted that in the vast majority of cases, step 96 will find that the speculative readout was successful. Therefore, on average, the global locking latency has very little impact on the overall readout latency.

In some embodiments, as will be explained below, the server also considers the time it took to obtain the locks in evaluating whether to regard the speculatively-read data as valid. If this time is longer than a predefined time-out, then the server regards the speculatively-read data as invalid, even though the locking mechanism has granted all the lock requests. The time-out is typically set to be larger than the maximum round-trip delay between a server and a locking mechanism, plus safety margin.

The flow of FIG. 3 is an example flow that is depicted purely for the sake of conceptual clarity. In alternative embodiments, any other suitable readout process that involves global locking and speculative readout can be used.

Figure 4:
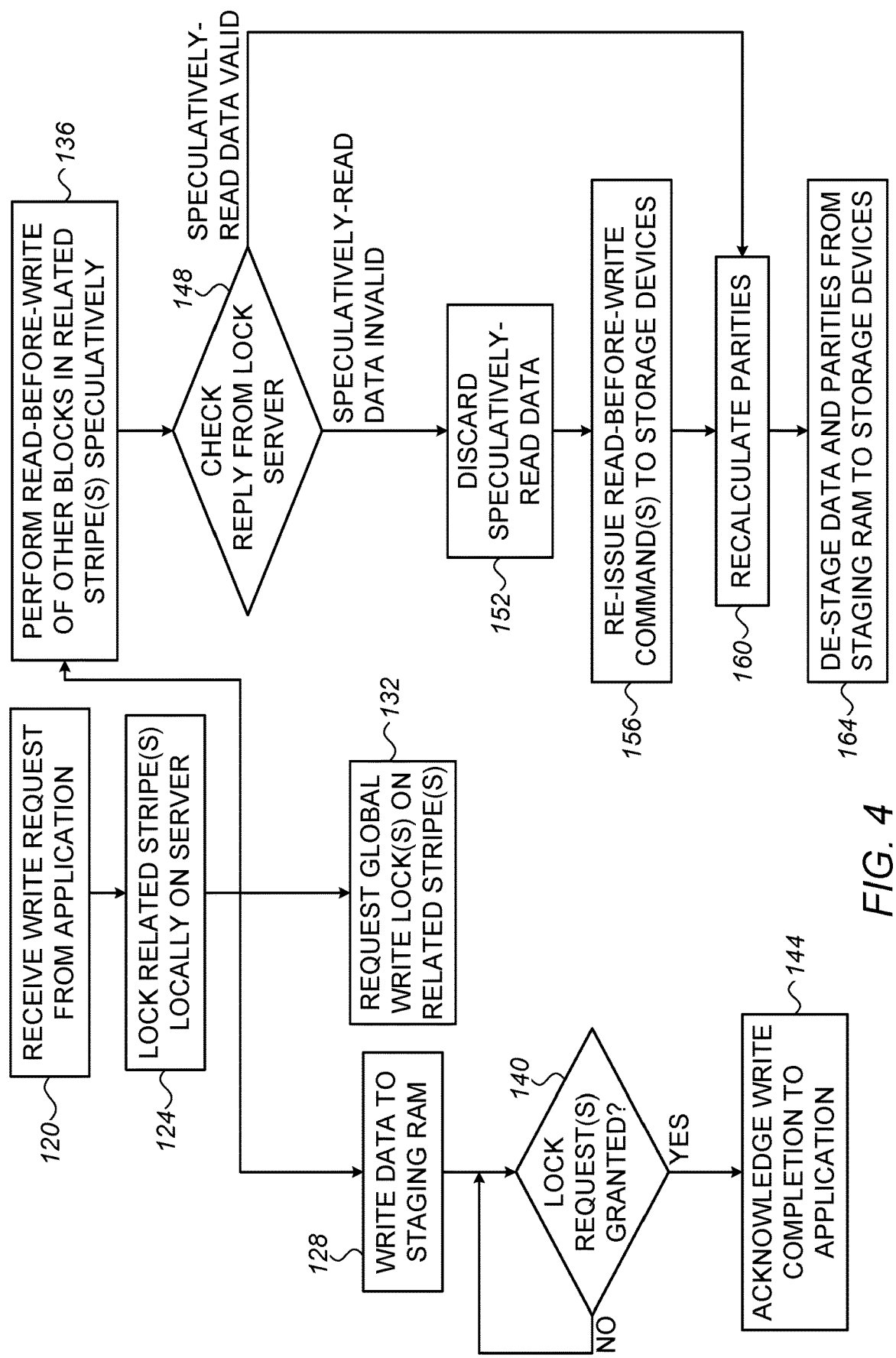
FIG. 4 is a flow chart that schematically illustrates a method for writing to a shared volume, in accordance with an embodiment of the present invention.

FIG. 4 is a flow chart that schematically illustrates a method for writing to a shared volume, in accordance with an embodiment of the present invention. The method of FIG. 4 is carried out by agent 40 in a certain server 24. The method begins with agent 40 receiving a write request from a user application 44, at a write requesting step 120. The write request typically provides data to be stored on storage devices 28, and specifies a range of user-volume addresses in which the data is to be stored. The addresses may belong to one or more stripes.

Agent 40 first locks the relevant stripes locally, at a local locking 124. After performing local locking, agent 40 performs the following three actions at least partially in parallel:

At a staging step 128, agent 40 writes the data (provided in the write request) to staging RAM 46, e.g., using RDMA write operations. Agent 40 typically also writes appropriate journal entries that report the staging operations. The journals may be used at a later stage, for recovery from write holes and other failures.

At a global lock requesting step 132, agent 40 requests a global write lock on the relevant stripes. Step 132 may involve sending one or more lock requests to the global lock mechanism on storage controllers 36.

At a speculative read-before-write step 136, agent 40 issues one or more read commands that perform read-before-write in the relevant stripes. The read commands of step 136 typically read the parity blocks, and the required data blocks, in order to be able to calculate the new parities for the stripes in question. These read commands are again considered speculative.

Following step 128 (i.e., after the data and journal entries have been written to the staging RAM), at a grant checking step 140, agent 40 checks whether all global locks have been granted. As soon as the global locks are granted, agent 40 acknowledges completion of the write operation to user application 44, at a completion acknowledgement step 144.

Following step 136, at a reply checking step 148, agent 40 checks the reply that was received from the global locking mechanism in response to the write lock request. In the case of a write lock request, the global locking mechanism replies only after it obtains a lock on the stripes in question for serving the request. In addition to indicating that the locks have been granted, the reply also indicates whether the speculatively-read data is valid or not.

If the reply, checked at step 148, indicates that the speculatively-read data is invalid, agent 40 discards the speculatively-read data, at a discarding step 152, and re-issues the read commands of the read-before-write operation, at a re-reading step 156. Then, at a parity recalculation step 160, agent 40 recalculates the parities for the stripes based on (i) the new data to be written (received at step 120), and (ii) the data read in the read-before-write operation (read at step 136 or 156). The recalculated parities are stored in staging RAM 46, in place of the previous parities.

If, at step 148, agent 40 finds that the speculatively-read data is valid, steps 152-156 are skipped, and the method proceeds directly to parity recalculation step 160. At a de-staging step 164, agent 40 de-stages the data and parities from staging RAM 46 to storage devices 28. The write operation is then complete.

In the write process, too, the server typically considers the time it took to obtain the locks in evaluating whether to regard the data obtained in a read-before-write operation as valid. If this time is longer than a predefined time-out, then the server regards the speculative read-before-write as invalid, even though the locking mechanism has granted all the lock requests. As in read operations, the time-out is typically set to be larger than the maximum round-trip delay between a server and a locking mechanism, plus safety margin.

The flow of FIG. 4 is an example flow that is depicted purely for the sake of conceptual clarity. In alternative embodiments, any other suitable write process that involves global locking and speculative readout can be used. For example, the method of FIG. 4 assumes that the write operation updates only parts of the stripes, and therefore read-before-write is necessary. When updating an entire strip, steps 136-164 can be omitted.

Evaluation of Lock Requests by the Global Locking Mechanism

As explained above, the validity of a speculative read is determined by the lock server (or other global locking mechanism on storage controllers 36). The lock server regards a speculative read as invalid if a write lock is held at the time the remote lock request arrives.

A request waiting for a writer implies that there is a chance that the speculative read was issued after another server already acknowledged the respective write, but before the write was written to storage devices 28, thus violating causality and returning stale (old) data.

Otherwise, if the request does not wait for a writer, then either the read lock request arrived before a write request, or after the lock was already released. If the former, then the read was also issued before the write request, and therefore returning the old data is correct. If new data happens to be written to storage devices 28 sufficiently quickly, it is also correct to return the new data, as causality is preserved. If the latter, then the only way to ensure that the write was not acknowledged after being staged in the staging RAM, and yet the read returned old data, is to ensure that the stripe was not locked for write during the period between the time the read was issued and the time the read lock is returned.

Therefore, in some embodiments, when receiving a read lock request, the lock server also verifies whether the stripe or stripes in question were locked for write within a predefined time interval before the lock request was received. In some embodiments, the lock server implements this verification by keeping write lock records in a hash table, or in any other suitable data structure, and periodically scrubbing records that are older than the maximum possible round-trip time between a server and a lock server, with a large enough safety margin. In some embodiments, if the lock server finds that the stripe or stripes were locked for write operations more recently than the predefined time interval, the lock server will mark the speculative read as invalid. The server will deem a response from a lock server, which arrives later than such a time-out (minus the safety margin) as invalidating the speculative read.

The above process can be modified slightly to support degraded mode (storage device failures). In degraded mode, a speculative read lock actually does lock stripes even if the lock server determines that a speculative read should be allowed. This change delays any write locks from being acquired until the read is completed, thus eliminating the possibility of discrepancy between the data blocks and parities.

Write Holes and Journaling

In various practical scenarios, write holes may be created during operation of system 20. A write hole is typically created when a sudden crash occurs during a write operation. The crash may lead to an inconsistency between the data and parities in one or more stripes. When inconsistency occurs, the stripe will remain inconsistent through future partial writes, and only a full stripe write will restore its consistency. When a storage device 28 fails, a degraded read operation, which uses these parities, will return corrupt data.

When a write cache such as staging RAM 46 is used, a sudden server crash, which occurs after a write is stored in the staging RAM and acknowledged but before it is destaged, is a different scenario than a write hole leading to the loss of written data.

In some disclosed embodiments, the various I/O steps are journaled in order to successfully recover from write holes. A journal is typically maintained in the staging RAM per storage device 28 and server 24. The journal is updated using RDMA writes, and is read using RDMA reads. The combined journals of all storage devices are used to resolve write hole scenarios.

Further aspects of journaling, and of using journals for recovering from write holes and other failures, are addressed in U.S. Pat. No. 9,842,084, whose disclosure is incorporated herein by reference.

Recovery from Lock-Server Failures

As noted above, in some embodiments the storage controllers run multiple lock-server instances in order to increase scalability. In some embodiments, each lock-server instance is assigned a range of I/O addresses (e.g., logical block addresses—LBAs), and incoming lock requests are assigned to lock-server instances based on the addresses. This assignment scheme is also referred to as sharding of lock-server instances.

A failure of one or more lock-server instances typically causes loss of all locks held by that lock-server instance. In some embodiments, redundant lock-server instances may be used (e.g., two replicas that backup one another) to significantly decrease the likelihood of losing locks.

In response to detecting a failure of a lock-server instance, a new sharding scheme should typically be devised and agreed upon by all participating servers 24, before I/Os may resume. Disagreement on the sharding scheme (e.g., one server using a previous scheme and another server using a new scheme) may lead to locks for the same stripe being taken at different shards, leading to concurrent write access to stripes and data corruption.

In some embodiments, storage controllers 36 run a distributed process of updating the sharding scheme in case of failure of a lock-server instance. In an embodiment, the storage controllers generate a respective lock-server instance ID (GID) for each lock-server instance. The GIDs are replicated between the storage controllers. The storage controller regenerate the GID when a lock-server instance starts, and also when a storage device 28 is removed (e.g., fails) or added. The GID is agreed upon by all storage controllers 36, for example using a consensus scheme (e.g., using a consensus algorithm such as Paxos or Raft, or by using virtual-synchrony, or any other means). The GID is published to all servers 24 as part of the volume map.

In this embodiment, a server 24 receives the GID in the initial message exchange when connecting to a lock-server instance. If the GIDs received from all lock-server instances do not match, the server retries until a match is attained. If a GID in a volume map published by a storage controller does not match the GIDs received from the lock-server instances, the server again waits for a complete match. In an embodiment, the server may either poll a controller 36 for an updated volume map, or receive an unsolicited update from such a controller.

As will be explained below, storage controllers 36 maintain server volume references, and use them for write-hole recovery. When referencing a volume, the server attempts to reference the volume using the GID above. To prevent access by servers using different lock-server sharding schemes, a volume may only be referenced by a single GID, causing servers to wait for an incompatible GID to be cleared before accessing the volume. The storage controllers clear a GID from the volume map upon the completion of write-hole recovery of all servers referencing the volume. In an embodiment, the server may either poll a controller 36 using its own GID, or receive an unsolicited update from such a controller.

Alternatively, system 20 may use any other suitable process for recovering from failures of lock-server instances.

Recovery from Write Holes

In some embodiments, storage controllers 36 run a write-hole recovery process that is based on the scheme describes in U.S. Pat. No. 9,842,084, cited above. In an embodiment, the storage controllers maintain a list of references for each volume. Each reference comprises an ID of the referencing server, a recovery ID, and optionally the GID as described above.

As done for non-shared volumes, upon server failure, the recovery process finds all incomplete I/Os from the write journals written by the failed server. A remote lock held for a specific server I/O is released by the recovery process only after the affected stripes are recovered, allowing the recovery process sole access to the stripes that require recovery.

A remote lock held in lock-server instance comprises the associated recovery ID, and optionally the GID. Once all the writes of the failed server are recovered by the recovery process, the recovery process contacts all lock servers, requesting them to release all locks belonging to the failed server's recovery ID (and, either implicitly or explicitly, the GID used by the server at the time of locking). The GID is not mandatory, since a recovery ID by itself uniquely identifies the locks.

Alternatively, system 20 may use any other suitable process for recovering from write holes.

Global Locking for Background Processes

In some embodiments, global locking may be requested by background processes running in storage controllers 36. Examples of such background processes are a rebuild/redistribute process that rebuilds a storage device 28 or redistributes data to a new storage device 28, a restriping process that changes the RAID scheme (e.g., from RAID 6 to RAID 5, or distributes stripes over a different number of storage devices). In such processes, a global lock may be needed for providing the background process exclusive access to stripe or volume ranges. Such a lock is referred to herein as a Background Process Lock (BPL).

A background process typically operates on ranges of volume data, rebuilding or redistributing data, while maintaining exclusive access (a lock) on each range that is currently being processed. In an embodiment, a BPL may be implemented by contacting all connected servers and acquiring a lock on them such that server I/Os targeted at a range of stripes would wait until the background process completes operating on the range.

Lock-server instances, as described above, may also be used to lock ranges in place of the server-side locking mechanism.

In many practical cases, background processes often operate on large ranges (e.g., Gigabytes), in comparison with ordinary I/Os that are typically smaller than one or two Megabytes. Therefore, using the same data structures for server-requested global locks and for BPLs may be sub-optimal in terms of memory utilization and performance. Thus, in some embodiments BPLs are implemented separately.

In an embodiment, a BPL is implemented using a two-stage locking mechanism. The BPL forms the first stage, which locks a range of stripes. A stripe-based I/O lock (e.g., a lock that uses a hash table keyed by stripe ID) forms the second stage.

In this embodiment, the BPL comprises two generation numbers, denoted BPL.generation and BPL.bg_lock_generation, and an array of size two. Each entry in the array contains a counter of the number of I/Os that passed the lock with a given generation modulo 2.

Initially, BPL.generation is initialized to 1 and BPL.bg_lock_generation is initialized to 0. A new I/O first checks the state of the BPL, which can be "unlocked," "locking" or "locked." If the state is not "unlocked," and the I/O overlaps the current BPL, the I/O is queued waiting for the BPL. Otherwise, the I/Os generation is set to BPL.generation, the respective counter for this generation is incremented by 1, and the stripe lock for the I/O is acquired.

When a background process prepares to start operating on a new range of stripes, the background process first tries to lock the range on all servers. The BPL first waits for all I/Os on the previous generation (BPL.generation−1) to complete, by waiting for the respective counter to drop to zero. BPL.bg_lock_generation is then set to BPL.generation, BPL.generation is incremented, and BPL.state is transitioned from "unlocked" to "locking."

Recall that any new I/O that overlaps the BPL will now be queued. Non-overlapping I/Os now increase the respective counter of BPL.generation while the BPL lock waits for all I/Os with generation BPL.bg_lock_generation to drain (such that the respective counter drops to zero). Once all such I/Os are drained, the BPL lock transitions from the "locking" state to the "locked" state. The BPL is unlocked when the background process completes operating on the range of stripes, transitioning the BPL state to "unlocked" and issuing the queued I/Os.

In some embodiments, storage controllers 36 respond to a crash of a background process by releasing the BPLs and allowing I/O to resume. In an embodiment, a background crash is detected and handled by a monitoring process running on each controller 36. The monitoring process then queries all servers to release all existing and pending BPLs, thereby allowing I/Os to proceed.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, in a system that comprises multiple servers, multiple multi-queue storage devices and at least one storage controller that communicate over a network, the method comprising:

receiving in a server, from an application running on the server, a request to access data belonging to one or more stripes, wherein the stripes are stored on the storage devices and are shared with one or more other servers;

in response to the request, performing at least partially in parallel (i) requesting one or more global locks that prevent the other servers from accessing the stripes, and (ii) reading at least part of the stripes from the storage devices speculatively, irrespective of whether the global locks are granted; and upon verifying that the speculatively-read data is valid, completing to execute the request.

2. The method according to claim 1, and comprising, upon finding that the speculatively-read data is not all valid, re-reading the at least part of the stripes from the storage devices after the global locks are granted.

3. The method according to claim 1, wherein the request from the application comprises a request to read the data, and wherein reading the stripes speculatively comprises reading the requested data from the storage devices.

4. The method according to claim 1, wherein the request comprises a request to write given data in place of previous data, and wherein reading the stripes speculatively comprises reading from the stripes (i) data other than the given data, and (ii) redundancy information.

5. The method according to claim 4, wherein, when the other data and the redundancy information have been read speculatively and are valid, completing to execute the request comprises recalculating the redundancy information, and writing the given data and the recalculated redundancy information to the stripes on the storage devices.

6. The method according to claim 4, and comprising, when the other data and the redundancy information have been read speculatively but are not all valid, completing to execute the request by re-reading the other data and the redundancy information, recalculating the redundancy information, and writing the given data and the recalculated redundancy information to the stripes on the storage devices.

7. The method according to claim 1, further comprising:
assessing a time that elapsed between requesting the global locks and receiving a notification that the global locks are granted; and
if the time that elapsed exceeds a predefined time-out, regarding the speculatively-read at least part of the stripes as invalid, even though the global locks have been granted.

8. The method according to claim 1, further comprising:
receiving in the storage controller, from the server, a request to apply a global lock on a stripe of data stored on the storage devices; and
granting the request only when (i) no global lock is currently applied on the stripe, and (ii) the stripe was not globally locked for write operations for at least a predefined time period prior to arrival of the request.

9. A server, comprising:
a network interface, configured to communicate over a network with multiple multi-queue storage devices and at least one storage controller; and a processor, configured to:
receive, from an application running on the server, a request to access data belonging to one or more stripes, wherein the stripes are stored on the storage devices and are shared with one or more other servers;
in response to the request, perform at least partially in parallel (i) requesting one or more global locks that prevent the other servers from accessing the stripes, and (ii) read at least part of the stripes from the storage devices speculatively, irrespective of whether the global locks are granted; and
upon verifying that the speculatively-read data is valid, complete to execute the request.

10. The server according to claim 9, wherein, upon finding that the speculatively-read data is not all valid, the processor is configured to re-read the at least part of the stripes from the storage devices after the global locks are granted.

11. The server according to claim 9, wherein the request from the application comprises a request to read the data, and wherein the processor is configured to speculatively read the requested data from the storage devices.

12. The server according to claim 9, wherein the request comprises a request to write given data in place of previous data, and wherein the processor is configured to speculatively read from the stripes (i) data other than the given data, and (ii) redundancy information.

13. The server according to claim 12, wherein, when the other data and the redundancy information have been read speculatively and are valid, the processor is configured to complete to execute the request by recalculating the redundancy information, and writing the given data and the recalculated redundancy information to the stripes on the storage devices.

14. The server according to claim 12, wherein, when the other data and the redundancy information have been read speculatively but are not all valid, the processor is configured to complete to execute the request by re-reading the other data and the redundancy information, recalculating the redundancy information, and writing the given data and the recalculated redundancy information to the stripes on the storage devices.

15. The server according to claim 9, wherein the processor is configured to:
assess a time that elapsed between requesting the global locks and receiving a notification that the global locks are granted; and
if the time that elapsed exceeds a predefined time-out, regard the speculatively-read at least part of the stripes as invalid, even though the global locks have been granted.

* * * * *